United States Patent
Desprez

(10) Patent No.: US 9,702,105 B2
(45) Date of Patent: Jul. 11, 2017

(54) DEVICE FOR TRANSLATIONALLY MANOEUVRING A STRUCTURE THAT IS ABLE TO MOVE WITH RESPECT TO A FIXED SUPPORT

(71) Applicant: NOV-BLM, Carquefou (FR)

(72) Inventor: Francois Desprez, Thouare sur Loire (FR)

(73) Assignee: NOV-BLM, Carquefou (FR)

( * ) Notice: Subject to any disclaimer, the term of this patent is extended or adjusted under 35 U.S.C. 154(b) by 0 days.

(21) Appl. No.: 14/777,067

(22) PCT Filed: Mar. 12, 2014

(86) PCT No.: PCT/FR2014/050551
§ 371 (c)(1),
(2) Date: Sep. 15, 2015

(87) PCT Pub. No.: WO2014/140473
PCT Pub. Date: Sep. 18, 2014

(65) Prior Publication Data
US 2016/0024737 A1    Jan. 28, 2016

(30) Foreign Application Priority Data
Mar. 15, 2013 (FR) ...................... 13 52311

(51) Int. Cl.
*E02B 17/08* (2006.01)
*F16H 35/10* (2006.01)
(Continued)

(52) U.S. Cl.
CPC ........... *E02B 17/0818* (2013.01); *F16H 1/46* (2013.01); *F16H 19/04* (2013.01); *F16H 35/10* (2013.01);
(Continued)

(58) Field of Classification Search
CPC combination set(s) only.
See application file for complete search history.

(56) References Cited

U.S. PATENT DOCUMENTS

| 2,434,480 A | 1/1948 | Anderson |
| 3,435,932 A | 4/1969 | Anderes |

(Continued)

FOREIGN PATENT DOCUMENTS

| CN | 202595719 U | 12/2012 |
| EP | 0 052 065 A2 | 5/1982 |

OTHER PUBLICATIONS

International Search Report, dated May 6, 2014, from corresponding PCT application.

*Primary Examiner* — Kyle Armstrong
(74) *Attorney, Agent, or Firm* — Young & Thompson

(57) ABSTRACT

A device for translationally maneuvering a structure able to move with respect to a fixed support, includes at least one rack and at least one output pinion which is driven by motor elements via a gear train borne by a chassis. At least one element of the gear train consists in a slave element borne by a shaft equipped with torque limiting elements collaborating with the chassis and having a limit torque which is determined so as to: immobilize the slave element in terms of rotation with respect to the chassis when its torque is below the limit torque to permit translational maneuvering of the mobile structure by the turning of the output pinion; and allow the slave element to rotate with respect to the chassis when its torque is higher than the limit torque, to avoid a static or dynamic overload being applied to the gear train.

10 Claims, 4 Drawing Sheets

(51) Int. Cl.
*F16H 19/04* (2006.01)
*F16H 1/46* (2006.01)
*E02B 17/02* (2006.01)
*E02B 17/00* (2006.01)

(52) U.S. Cl.
CPC ..... *E02B 17/021* (2013.01); *E02B 2017/0091* (2013.01)

(56) References Cited

U.S. PATENT DOCUMENTS

| | | | | |
|---|---|---|---|---|
| 4,387,881 | A | * | 6/1983 | McDuffie ............ E02B 17/0818 254/105 |
| 4,574,650 | A | | 3/1986 | Durand et al. |
| 4,609,076 | A | * | 9/1986 | Collins ................... F16D 55/38 188/170 |
| 4,657,437 | A | * | 4/1987 | Breeden ................ E02B 17/021 405/196 |
| 4,813,814 | A | | 3/1989 | Shibuta et al. |
| 5,092,712 | A | * | 3/1992 | Goldman .............. E02B 17/024 405/196 |
| 5,954,454 | A | * | 9/1999 | Bennett ................ E02B 17/021 405/196 |
| 5,975,805 | A | * | 11/1999 | Morvan ............. E02B 17/0818 405/196 |
| 6,099,207 | A | * | 8/2000 | Bennett ................ E02B 17/021 405/196 |
| 2003/0032519 | A1 | | 2/2003 | Lovatt |
| 2011/0165990 | A1 | * | 7/2011 | Tampieri ................... F16H 1/46 475/331 |

* cited by examiner

DEVICE FOR TRANSLATIONALLY MANOEUVRING A STRUCTURE THAT IS ABLE TO MOVE WITH RESPECT TO A FIXED SUPPORT

TECHNICAL FIELD TO WHICH THE INVENTION RELATES

The present invention relates to a device for maneuvering a mobile structure in lifting or lowering directions, with respect to a fixed support; the invention concerns in particular the field of offshore units, platform or ship, of the self-elevating type (often referred to as "jack-up").

TECHNOLOGICAL BACKGROUND

Some offshore units of the self-elevating type, referred to as "jack-up", comprise:
- a shell, allowing the unit to move by floating and receiving the useful part, and
- a plurality of mobile legs, maneuverable in lifting or lowering directions along the shell, intended to come in rest on the ground.

That way, these offshore units can move by floating when their legs are lifted up, while having a rest on the sea floor when these legs are lowered down.

To ensure their manoeuvre in lifting and lowering directions, these legs conventionally include racks cooperating with pinions driven by motor means equipping the shell.

However, today, such a self-elevating offshore unit can rest its legs against the sea floor only in the presence of a small swell, i.e. typically waves lower than 2 meters high.

Indeed, in case of moderate to high swell (typically waves whose height is higher than 2 meters or higher than 4 meters, respectively), the roll and pitch movements of the floating shell, combined with the stiffness of the legs, cause dynamic overloads at each percussion of these latter against the sea floor.

Such overloads come in particular from the pinion motor means that, due to their inertia, are not able to efficiently absorb the leg movements imparted by the swell.

This phenomenon is a serious limitation to the exploitation of such self-elevating units, used for example for the installation of wind turbines and also within the framework of certain oil drillings.

To remedy these drawbacks, the pinions of certain structures are mounted on a floating frame and connected to the shell by an elastic device of the elastomeric cushion type.

Such an elastic device allows a partial reduction of the dynamic overload.

However, in practice, this compensation is not sufficient.

It also reduces the stiffness and the stability of the offshore unit in lifted position, which goes against the desired objective, i.e. mounting this offshore unit on legs resting on the sea floor in order to immobilize it.

There hence exists a need for a maneuvering device adapted to efficiently dissipate and absorb the efforts coming from the percussion of the mobile legs against the sea floor.

Such a structure would be particularly interesting to allow the manoeuvre of the legs of a self-elevating unit in usually unfavourable swell conditions (i.e. moderate, or even high swell).

OBJECT OF THE INVENTION

For that purpose, in substance, the invention relates to an original approach in which torque limiting means are added in a gear train that connects the motor means to the output pinion(s).

In particular, the device according to the invention, for translationally maneuvering a mobile structure (advantageously in lifting or lowering directions) with respect to a fixed support, comprises:
- at least one rack, integral with said mobile structure or said fixed support, and
- at least one output pinion, integral with said fixed support or said mobile structure, respectively, which meshes with said rack, for the translational manoeuvre of said mobile structure along a translation axis (advantageously vertical).

The output pinion is driven by motor means, through a gear train carried by a frame, which gear train comprises wheel, pinion and/or ring gear elements.

Moreover, one at least of said elements of said gear train consists in a controlled element carried by a shaft equipped with torque limiting means cooperating with said frame, which torque limiting means have a limit torque that is determined so as:
- to immobilize in rotation said controlled element with respect to said frame when the torque thereof is lower than said limit torque, in order to ensure the manoeuvre in translation of said mobile structure by the driving into rotation of said output pinion, and
- to allow a rotation of said controlled element with respect to said frame when the torque thereof is higher than said limit torque, to avoid the application of a static or dynamic overload to said gear train.

Such a maneuvering device has for interest to be able to efficiently dissipate and absorb the static and dynamic overloads occurring during the manoeuvre of the mobile structure near the ground, combined with movements generated by the external conditions.

Other advantageous characteristics, which can be taken in combination or independently from each other, are stated hereinafter:
- the limit torque of the torque limiting means is comprised between 0.1 and 3 times the nominal effort (corresponding advantageously to the fixed support weight, as the case may be the offshore unit shell weight);
- the torque limiting means include means for adjusting the limit torque during the manoeuvre;
- the torque limiting means include means for piloting them to an inactive position, in which the controlled element is immobilized in rotation with respect to said frame;
- the torque limiting means consist in a multi-disk brake;
- the torque limiting means are associated with water cooling means;
- the maneuvering device includes a vertical rack associated with an output pinion, and the gear train includes two parallel groups in which (i) a first group, for driving said output pinion into rotation, is driven directly by the motor means, and (ii) a second group includes said controlled element associated with said torque limiting means;
- the device includes at least two output pinions that each mesh with one rack and that extend along parallel axes, which output pinions are driven by motor means, through the gear train.

These output pinions advantageously extend along horizontal axes and they are arranged either in the same horizontal plane or substantially the same horizontal plane (so as, preferably, to each cooperate with one rack), or in the same vertical plane or substantially the same vertical plane (so as, preferably, to both cooperate with a same rack).

Within the framework of this latter embodiment, the gear train advantageously includes two parallel groups each arranged so as to drive one of the two output pinions, in which:
- (i) a first group, for driving into rotation a first one of said output pinions, is driven directly by the motor means, and
- (ii) a second group, for driving into rotation a second one of said output pinions, is driven by said first group, which second group includes said controlled element associated with said torque limiting means.

Within this framework, the first group and the second group advantageously each comprise at least one epicyclic reducer consisted of a planetary gear, a ring gear and satellite gears; the planetary gear of said second group corresponds to the controlled element associated with the torque limiting means, and the satellite gears of this second group are arranged so as to drive, directly or indirectly, the second output pinion.

In this case, the ring gears of the two parallel groups advantageously include means for their rotational coupling, for example through external teeth directly coupled to each other or through an intermediate idling pinion.

Still in this case, each parallel group advantageously include, downstream the epicyclic reducer, two serial reducers: —an epicyclic reducer, consisted of a planetary gear, a ring gear and satellite gears, and—a toothed wheel; moreover, the serial reducers are inverted on the two parallel groups, with rotational coupling means between the ring gear of one epicyclic reducer of one of said parallel groups and the toothed wheel of the other parallel group.

The present invention also generally relates to an equipment for maneuvering a mobile structure in lifting or lowering directions with respect to a fixed support, wherein said equipment includes several devices according to the invention, superimposed to each other.

Such equipment advantageously consists in an offshore unit of the self-elevating (or "jack-up") type, in which the mobile structure is consisted by the leg and the fixed support is consisted by the shell.

Preferably, the frame equips the fixed support (in other words, the frame is advantageously carried by the fixed support).

Such a structure is particularly interesting in that it allows the manoeuvre of the self-elevating unit legs in usually unfavourable swell conditions (i.e. moderate, or even high swell), by preventing the application of a static or dynamic overload to the gear train.

It allows in particular an efficient dissipation and absorption of the efforts coming from the percussion of the mobile legs against the sea floor.

DETAILED DESCRIPTION OF AN EXEMPLARY EMBODIMENT

The present invention is further illustrated, without being limited in anyway, by the following description of different embodiments, in relation with the appended drawings, in which.

Figure 3:
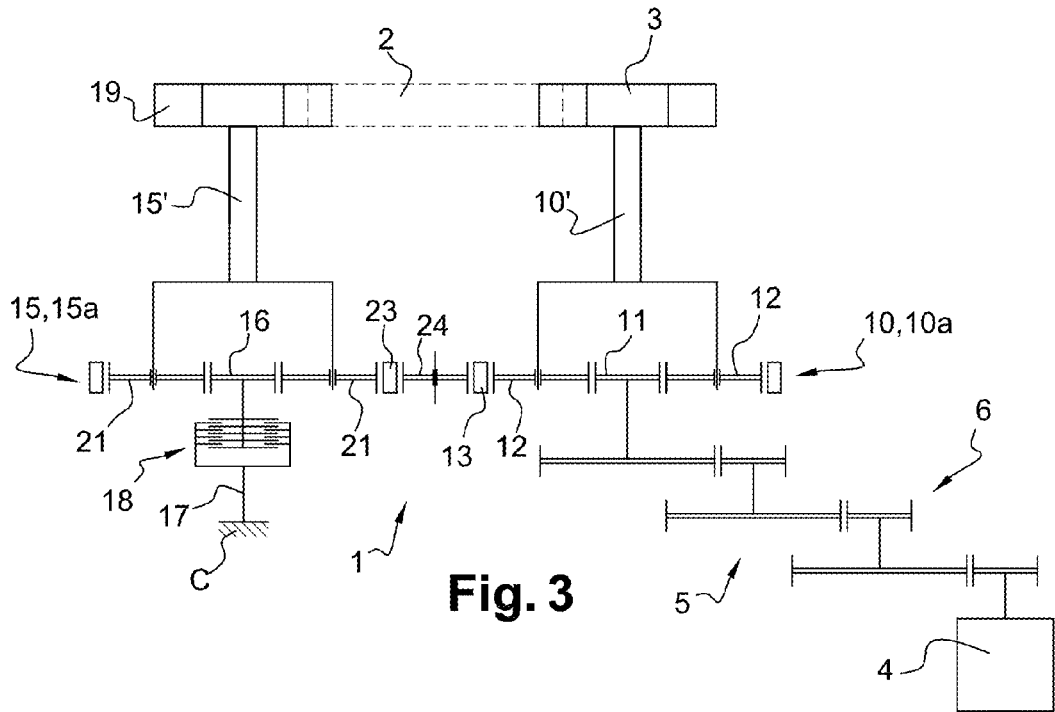
Figure 5:
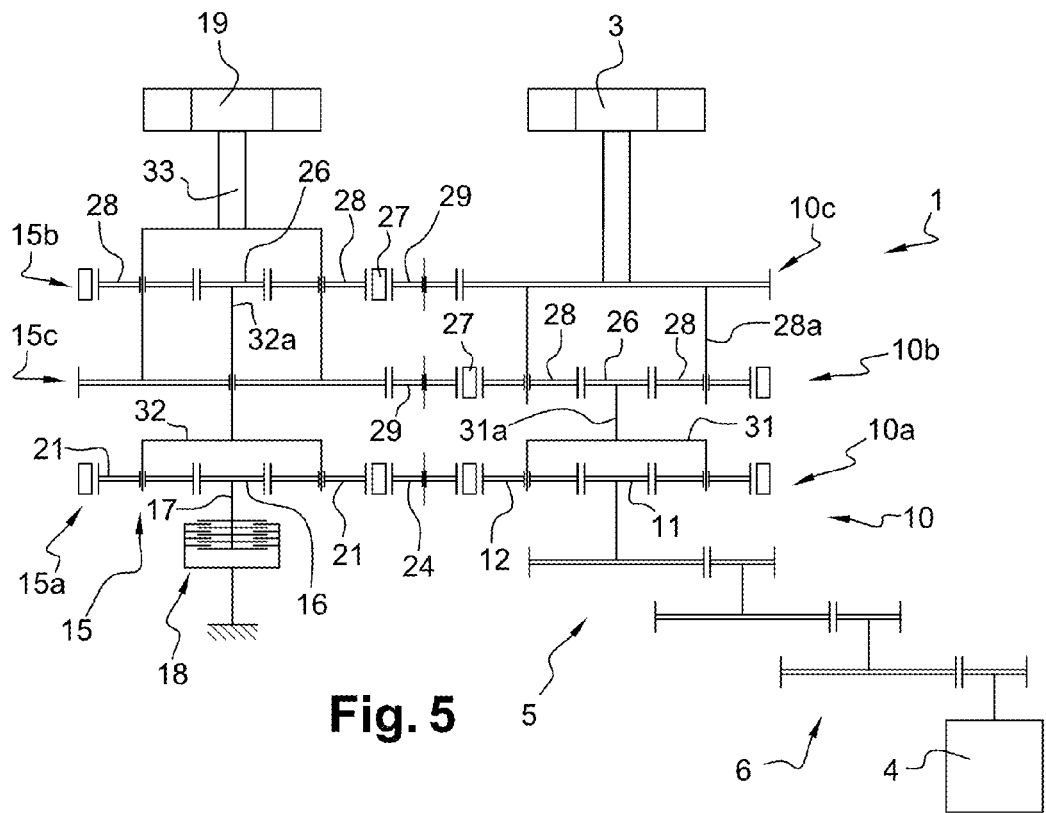
Figure 4:
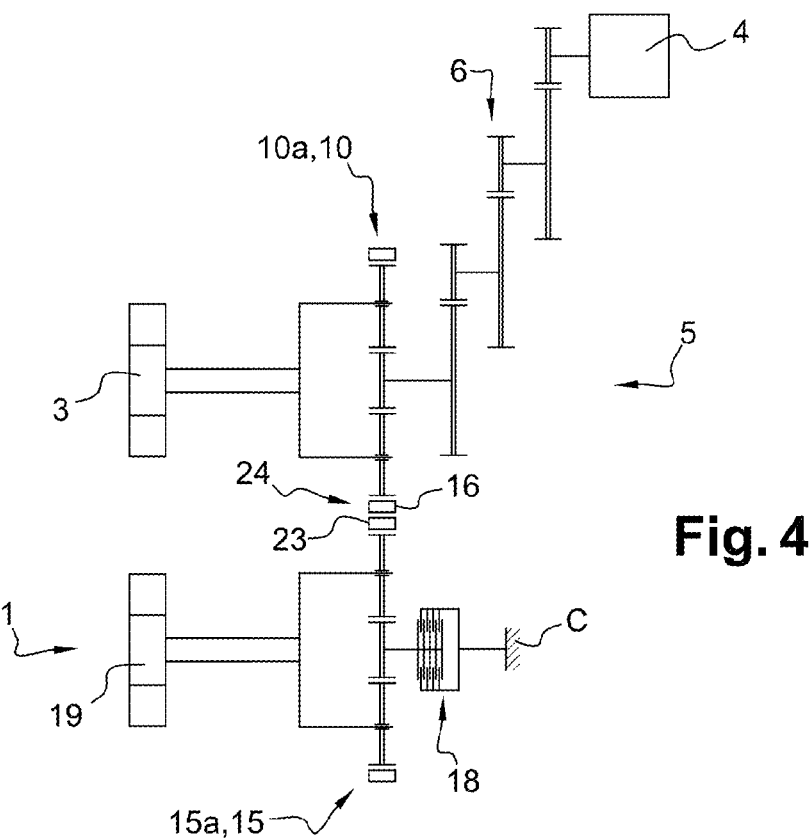
Figure 6:
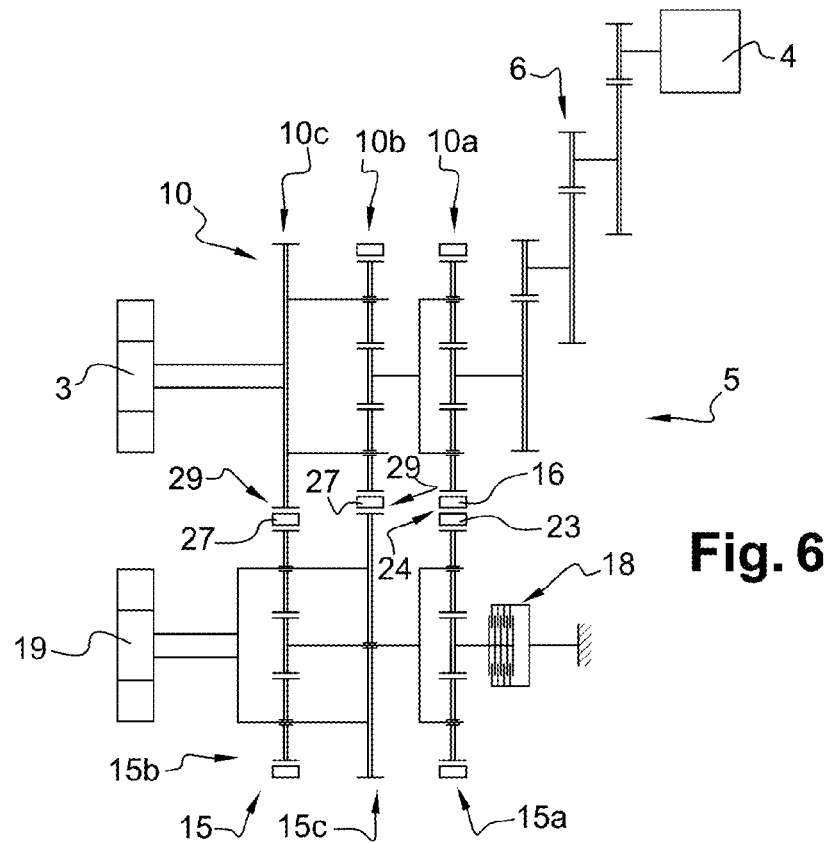

FIG. 3 schematically shows a second embodiment of a device according to the invention, comprising two output pinions intended to be mounted in a horizontal plane and whose gear train includes two parallel groups each comprising an epicyclic reducer;

FIG. 4 shows a third embodiment of a device according to the invention, forming a variant of the embodiment according to FIG. 3, in which the output pinions are mounted in a vertical plane;

FIG. 5 shows a fourth embodiment of a device according to the invention, in which the two output pinions are mounted in a horizontal plane and are driven into rotation by a gear train that comprises two parallel groups each consisted of two reducers positioned in series in an upstream epicyclic reducer;

FIG. 6 shows a fifth embodiment of a device according to the invention, forming an alternative to the embodiment according to FIG. 5, in which the output pinions are mounted in a vertical plane.

The maneuvering devices 1 according to the invention are advantageously intended to equip a mobile unit.

Figure 1:
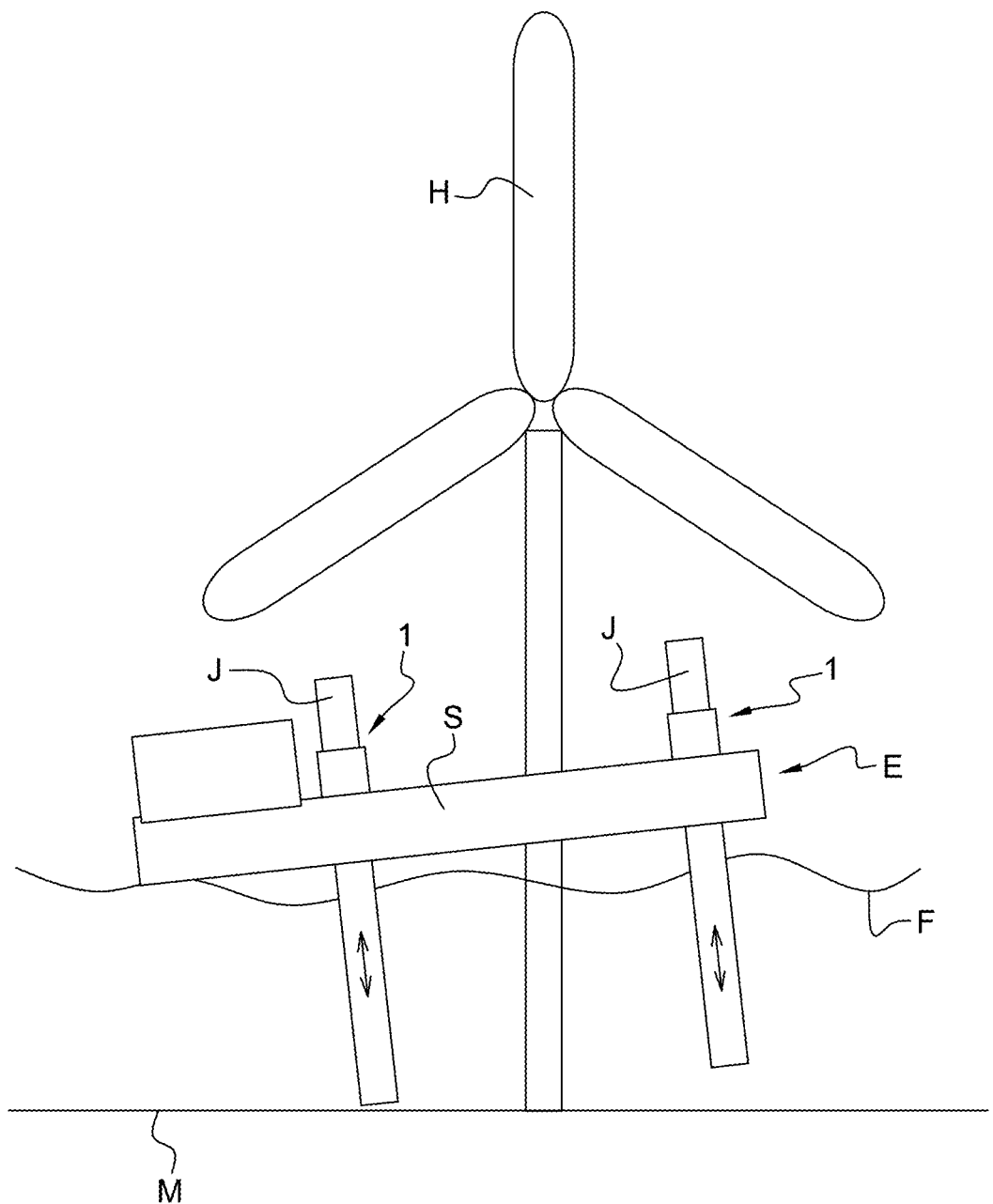
FIG. 1 is a general schematic view of an offshore unit equipped with maneuvering devices according to the invention.

This mobile unit E advantageously consists in a platform or a ship, of the self-elevating type (also currently referred to as "jack-up"), which is met in particular in offshore applications, for example for the installation of offshore wind turbines (FIG. 1).

The maneuvering device according to the invention is in particular intended to allow the manoeuvre in lifting or lowering directions of a mobile structure J, for example a leg, with respect to a fixed support S, for example a shell of the offshore unit E.

Such an offshore unit E is able to move through the floating of its shell S at the surface of water F when the legs J are lifted up; this unit E is able to rest on the sea floor M when its legs J are lowered down, possibly so that its shell S is located above the surface of water F.

In practice, as illustrated in FIG. 1, the self-elevating unit E includes several legs J each associated with this maneuvering device 1, or even several maneuvering devices 1 that are superimposed to each other within a maneuvering equipment.

Such a maneuvering device 1 could be implemented for displacing any other mobile structure with respect to a fixed support, using a gear transmission of the "pinion-rack" type.

Figure 2:
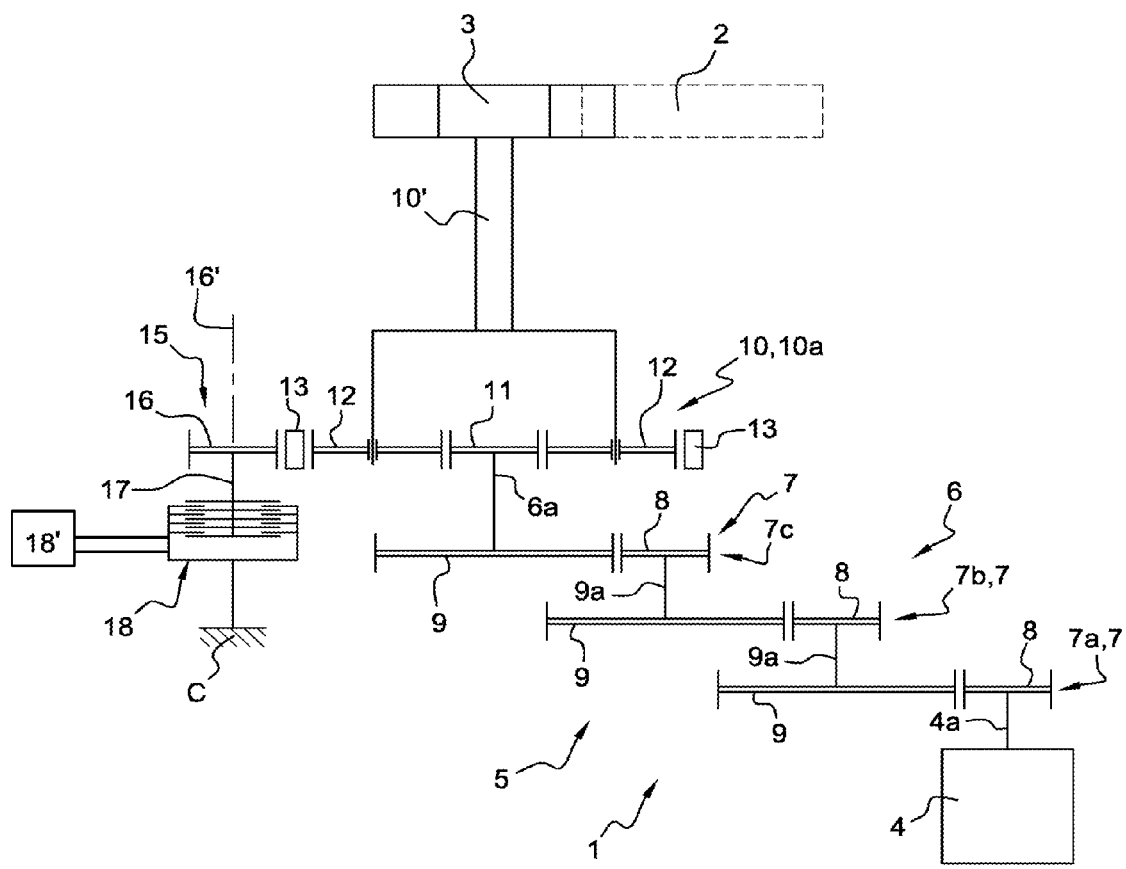
FIG. 2 is a general and schematic view of a first embodiment of a device according to the invention, including a single output pinion that is driven by a gear train associated with motor means.

In a first embodiment illustrated in FIG. 2, this maneuvering device 1 comprises:
- at least one vertical rack 2 (shown very schematically in FIG. 2), advantageously integral with one of the legs (not shown), and
- an output pinion 3, which is herein integral with the fixed support and which meshes with the vertical rack 2.

According to the required power, several maneuvering devices 1 may be superimposed to each other so as to cooperate with a same rack 2 equipping the leg to be maneuvered.

The output pinion 3 is driven by motor means 4, through a gear train 5 carried by a frame C (illustrated very schematically herein in FIG. 2), which advantageously equips the fixed support.

The motor means 4 advantageously consist in a motor of the hydraulic or electric type.

The gear train 5 comprises, in a manner conventional per se, different wheel, pinion and ring gear elements.

On the side of the motor means 4, this gear train 5 comprises an upstream group of serial elementary reducers 6, herein with a parallelism geometry.

This upstream group of elementary reducers 6 consists in particular in a series of elementary reducers 7.

These elementary reducers 7 are herein three in number, i.e., successively from the upstream to the downstream, an upstream elementary reducer 7a, an intermediate elementary reducer 7b and a downstream elementary reducer 7c.

Each of these elementary reducers 7 consists in a reducer with an external cylindrical gear, which consists of a single gear comprising a pinion 8 and a wheel 9.

In particular, the pinion 8 of the upstream elementary reducer 7a is driven into rotation by an output shaft 4a of the motor means 4. The pinions 8 of the intermediate 7b and downstream 7c elementary reducers are for their part driven by the output shaft 9a continuing the wheels 9 of the upstream 7a and intermediate 7b elementary reducers.

The wheel 9 of the downstream elementary reducer 7c is for its part equipped with an intermediate shaft 6a forming, on the one hand, the output shaft of the upstream group of elementary reducers 6 and, on the other hand, the input shaft of a first downstream reducer group 10, intended to drive the output pinion 3 into rotation.

This first downstream reducer group 10 herein consists in a secondary reducer 10a of the elementary epicyclic reducer type.

The epicyclic reducer 10a consists of different elements:
a pinion 11, forming a planetary gear, driven into rotation by the above-mentioned intermediate shaft 6a,
satellite gears 12, driven into rotation about the planetary pinion 11 and connected to an output shaft 10' associated with the output pinion 3 cooperating with the rack 2, and
a ring gear 13, cooperating with the satellite pinions 12, adapted to undergo a phenomenon of rotation.

This epicyclic reducer 10a is coupled to a second downstream group 15 constitutive of the gear train 5 and forming a parallel group that is structured so as to prevent the application of a static or dynamic overload within this gear train 5.

Generally, a "static overload" consists in an increase of the external effort on the output pinion 3 (or the output pinions) whereas the motor means 4 are stationary.

A "dynamic overload" consists for its part in an increase of the effort on the output pinion 3 (or the output pinions) that is caused by the rotational inertia of the motor means 4.

In this respect, this second downstream group 15, parallel to the first group 10, comprises a controlled pinion 16 that is able to pivot about an axis of rotation 16' and that is coupled with the ring gear 13 of the epicyclic reducer 10a.

This coupling is herein made by a direct meshing of this controlled pinion 16 with external teeth (not shown) arranged on the ring gear 13 of the epicyclic reducer 10a.

This controlled pinion 16 is carried by a shaft 17 cooperating with the frame C, through torque limiting means 18 that define the torque to be applied to said controlled pinion 16 to cause the rotation thereof about its axis 16'.

Generally, by "torque limiting means", it is meant means able to allow the dissipation of efforts occurring within the gear train 5 when the torque in presence is higher than a determined value.

These torque limiting means 18 are chosen with a limit torque that is determined so as:
to immobilize in rotation the controlled pinion 16 (and hence the coupled ring gear 13) with respect to the frame C when the torque thereof is lower than said limit torque, so as to ensure a rotational manoeuvre of the satellite gears 12 adapted to cause the driving into rotation of the output pinion 3 and the putting into translation of the rack 2 with the associated mobile structure, and
to allow a rotation of said controlled pinion 16 about its axis of rotation 16' (and hence a rotation of the coupled ring gear 13) when the torque thereof is higher than said limit torque, to avoid the application of a static or dynamic overload on the gear train 5.

In particular, in case of overload, the ring gear 13 exerts an effort on the controlled pinion 16 until the latter enters into rotation, hence also allowing the rotation of the ring gear 13.

By "torque", it is meant herein in particular the rotational effort applied to the shaft 17 carrying the controlled pinion 16 and equipped with torque limiting means 18.

The value of this limit torque is advantageously comprised between 0.3 and 3 times the nominal effort, this nominal effort corresponding in particular to the weight of the shell S. Still preferably, this limit torque is comprised between 1 and 2 times the nominal effort.

By way of indication, the nominal effort is for example of 200 tons on each controlled pinion 16. The limit torque of the torque limiting means 18 is hence advantageously comprised between 200 tons and 400 tons.

The torque limiting means 18 consist for example in a multi-disk brake, which is associated with water cooling means 18'.

This embodiment of the torque limiting means 18 has the following advantages:
the shaft 17 carrying the controlled element 16 is fixed, and the torque limiting means 18 advantageously consist in a simple brake, hence providing the required reliability,
the torque limiting means 18 being fixed, the cooling water supply thereof is easy,
a high holding torque, a great braking power, a low size, a proven use in "offshore" environment are also obtained.

The torque limiting means 18 advantageously include means for adjusting the limit torque during the manoeuvre of the mobile structure.

These limit torque adjustment means consist for example in a device for modulating the clamping effort of the disks.

This limit torque adjustment is piloted for example by a pneumatic or hydraulic pressure, which contrasts with means for return to a maximum sliding torque position.

These limit torque adjustment means vary for example the limit torque as follows:
a low clamping effort (typically 0.3 time the nominal effort) when the weight of one leg applies alone on the controlled pinion 16, and
a progressive increase of the clamping effort when the unit goes out from the water and the weight thereof applies on the associated leg.

These limit torque adjustment means are advantageously controlled by suitable electronic and/or software means.

The torque limiting means 18 are also advantageously associated with means for measuring the torque at the output pinion 3.

These torque measuring means (not shown) are conventional per se and are advantageously chosen among the known devices.

The torque limiting means 18 still advantageously include means for piloting them to an inactive position, allowing a deactivation of these torque limiting means 18 and hence ensuring a locking in rotation of the controlled pinion 16, whatever the torque applied.

These inactive position piloting means may in practice be ensured directly by the torque limiting means 18 that are equipped with means for return to said inactive position in order to produce, at rest, a sliding torque higher than the resistance of the remaining of the device and be then considered as being locked.

Complementary or as an alternative, these inactive position piloting means consist for example in a device of the clutch type, preferably a jaw clutch.

These inactive position piloting means are for example implemented when there is no longer variable stress due to the sea, in particular when the shell S goes out from the water and the weight thereof is supported by the legs J.

In practice, the implementation of the motor means 4 allows the driving into rotation of the elements 8, 9 constitutive of the upstream group of elementary reducers 6.

When the associated leg is free to move, with no obstacle, in particular when this leg is not in rest on the sea floor, the torque at the shaft 17 carrying the controlled pinion 16 remains lower than the above-mentioned limit torque; this controlled pinion 16 and its associated ring gear 13 thus remain fixed.

The controlled pinion 16 and its ring gear 13 hence constitute controlled elements that are intended to bring this mechanism back to a single degree of mobility.

In this configuration, the output pinion 3 is controlled in rotation, through the gear train 5, hence causing the displacement of its rack 2 with the associated leg.

The leg is hence adapted to be translationally maneuvered, in lifting or lowering directions, by the gear train 5.

Likewise, when the leg is in normal rest against an obstacle (for example when the leg rests on the sea floor), the torque at the shaft 17 carrying the controlled pinion 16 increases while remaining lower than the above-mentioned limit torque.

In this case, the torque is for example of the order of 1 time the nominal effort.

When there is no longer variable stress due to the sea, in particular when the shell S goes out from the water and its weight is supported by the legs J, it is useful to deactivate the torque limiting means 18.

This leg in rest is here again adapted to be conventionally maneuvered in translation by the gear train 5.

In this case, the lowering movement of the leg with respect to the shell causes a lifting of the shell with respect to the surface of water; the lifting movement of the leg with respect to the shell causes a lowering of the shell towards the surface of water then a complete vertical retraction of this leg.

But, during the manoeuvre thereof, the leg is liable to undergo an effort oriented in its direction of translation, in particular in the lifting direction. Such a phenomenon occurs for example when the shell floats at the surface of water, with a swell imparting roll and/or pitch movements causing a percussion of this leg against the sea floor.

An overload is then generated on the output pinion 3, which affects the whole gear train 5.

Within this context, the ring gear 13 of the epicyclic reducer 10*a* generates a rotational effort on the controlled pinion 16, leading to an increase of the torque at its shaft 17.

If this torque exceeds the characteristic limit torque of the torque limiting means 18, the controlled pinion 16 then enters into braked rotation about its axis 16'; this phenomenon hence allows the rotation of the associated ring gear 13.

The driving of the motor 4 is hence transmitted to the controlled pinion 16 through the associated ring gear 13.

This mechanical phenomenon hence allows the dissipation of this generated overload, avoiding a mechanical deterioration of the elements constituting the gear train 5.

Moreover, during these maneuvers of the leg, it may be interesting to adjust the characteristic limit torque of the torque limiting means 18.

When all the mass or at least approximately all the mass of the unit is transferred to the legs in rest on the sea floor, which is determined by the above-mentioned torque measuring means, the swell will no longer be liable to cause a percussion of the legs against this sea floor.

In this case, the translation is then advantageously piloted exclusively by the motor means 4, with the torque limiting means 18 in the deactivated configuration.

Conversely, when the shell comes back at the level of water, the torque limiting means 18 can be brought back into an active configuration, hence allowing to avoid the application of static/dynamic overloads to the gear train 5.

Other embodiments of the invention are described hereinafter in relation with FIGS. 3 to 6.

Generally, the references used in relation with FIG. 2 are kept to denote the identical or similar structures.

Hence, FIG. 3 shows a manoeuvre device 1 similar to that described hereinabove in relation with FIG. 2 in that it includes motor means 4 continued by an upstream group of elementary reducers 6 followed by two parallel downstream reducer groups 10, 15.

Here again, the first downstream reducer group 10, driven directly by the motor means 4, consist in an epicyclic reducer 10*a* that drives the output pinion 3 into rotation.

This embodiment differs from the preceding one by the presence of a second output pinion 19 that meshes with a second side of a double-type rack 2 (shown very schematically in FIG. 3).

The two pinions 3, 19, which attack the two sides of the rack 2, have horizontal axes of rotation that are herein located in the same horizontal plane, or at least approximately in the same horizontal plane.

This second output pinion 19 is driven into rotation through the second downstream reducer group 15.

This second downstream reducer group 15 is driven by the first downstream reducer group 10; and it includes the controlled pinion 16 associated, upstream, with the torque limiting means 18.

For that purpose, this second downstream reducer group 15 herein also consist in a secondary reducer 15*a* of the elementary epicyclic reducer type.

This epicyclic reducer 15*a* consists of different elements:
- the pinion 16, forming a planetary gear, constituting the controlled pinion carried by the shaft 17 equipped with the torque limiting means 18,
- three satellite pinions 21 (only two of which are shown), driven into rotation about the planetary gear 16 and connected to an output shaft 15' associated with the second output pinion 19 cooperating with the rack 2, and
- a ring gear 23, cooperating with the satellite gears 21.

The satellite gears 21 of this second downstream reducer group 15 hence drive directly the second output pinion 19.

The ring gear 23 of this second epicyclic reducer 15*a* cooperates with the ring gear 13 of the first epicyclic reducer 10*a* through rotation coupling means 24, in this case an intermediate idle pinion.

In normal operation, the satellites pinions 12 of the first epicyclic reducer 10*a* drive into rotation the first pinion 3, which meshes with one of the sides of the double rack 2.

These satellite pinions 12 also drive into rotation the ring gear 13, whose movement is transmitted to the ring gear 23 of the second epicyclic reducer 15a through the intermediate idle pinion 24.

The ring gear 23 of the second epicyclic reducer 15a then maneuvers the associated satellites 21 in rotation around the fixed, controlled pinion 16, hence causing the rotation of the second output pinion 19 on the other side of the double rack 2.

As mentioned hereinabove in relation with FIG. 2, the controlled pinion 16 is fixed in rotation as long as the torque of its shaft 17 remains lower than the limit torque of the associated torque limiting means 18.

The reduction ratio between the ring gear 13 of the first epicyclic reducer 10a and the satellite gears 21 of the second epicyclic reducer 15a is such that the efforts on the two pinions 3, 19 are close to each other.

The two output pinions 3, 19 of the gear train 5 have a differential movement and rotate in reverse directions. These two pinions 3, 19 hence develop rigorously proportional efforts, one of which being in reaction to the other.

The leg carried by the rack 2 is hence maneuvered in translation, according to a lifting or lowering movement.

This embodiment has the following advantages:
the effort is the same on the two pinions, in any circumstances,
the total weight of a two-pinion reducer unit is lower than the weight of two conventional units.

If an overload is generated on the output pinions 3 and 19, the two epicyclic reducers 10a and 15a generate a rotational effort in particular on the controlled pinion 16, causing an increase of the torque at the shaft 17 thereof.

If this torque exceeds the specific limit torque of the torque limiting means 18, the controlled pinion 16 then enters into rotation about its axis 16', generally due to a driving by an overload coming from the output pinions 3 and 19.

This mechanical phenomenon hence allows the dissipation of this overload, avoiding a deterioration of the elements constituting the gear train 5.

FIG. 4 illustrates a variant of the embodiment according to FIG. 3, which is different from the latter by the positioning of the output pinions 3, 19 in a same vertical plane, or at least approximately in a same vertical plane to cooperate with a same vertical rack.

This embodiment is interesting when the width of the rack is great, in the case of a cylindrical leg for example.

Within this framework, the gear train 5 is practically identical to that described hereinabove in relation with FIG. 3, in that it includes motor means 4 continued by an upstream group of elementary reducers 6 followed by two parallel downstream reducer groups 10, 15, each consisting in an epicyclic reducer 10a, 15a.

Here again, the second epicyclic reducer 15a is associated, downstream, with the second output pinion 19, and upstream, with the torque limiting means 18.

This embodiment differs only by the coupling means 24 between the two epicyclic reducers 10a and 15a.

Indeed, herein, the ring gear 16 of the first epicyclic reducer 10a is meshed directly with the ring gear 23 of the second epicyclic reducer 15a, advantageously through complementary external teeth.

The two output pinions 3, 19 of the gear train 5 have then a differential movement and rotate in a same direction.

This embodiment has the following advantages: a small vertical size, a low weight taking into account the absence of idle pinion, an equality of efforts on two "stages" of pinions.

FIG. 5 also shows an alternative embodiment of FIG. 3, whose interest is essentially a reduction of diameter of the reducer unit which allows a more compact assembly, which is lighter and less expensive.

This variant always includes motor means 4 continued by an upstream group of elementary reducers 6, followed by two parallel downstream reducer groups 10, 15.

Here again, the second downstream reducer group 15 is associated, upstream, with the second output pinion 19, and upstream, with the torque limiting means 18.

Each downstream reducer group 10, 15 still includes, upstream, an epicyclic reducer 10a, 15a, as described hereinabove in relation with FIG. 3.

But, downstream this epicyclic reducer 10a, 15a, each downstream reducer group 10, 15 differs by the presence of two additional reducers 10b, 10c; 15b, 15c arranged in series and coaxial to each other:
an additional epicyclic reducer 10b; 15b, consisted of a planetary pinion 26, a ring gear 27 and satellite pinions 28, and
a toothed wheel 10c; 15c.

In each downstream reducer group 10, 15, some elements are arranged coaxially to each other: the planetary pinion 11, 16 of the upstream epicyclic reducer 10a, 15a, the planetary pinion 26 of the downstream epicyclic reducer 10b, 15b and the toothed wheel 10c, 15c.

The satellite gears 12 and 21 of the upstream epicyclic reducers 10a, 15a drive indirectly the output pinions 3, 19 that are associated therewith.

The additional serial reducers 10b, 10c; 15b, 15c are inverted between the two downstream reducer groups 10, 15.

Hence, the first downstream reducer group 10 includes the epicyclic reducer 10b, followed by the toothed wheel 10c; conversely, the second reducer group 15 includes the toothed wheel 15c followed by the epicyclic reducer 15b.

Within this context, the epicyclic reducer 10b and the toothed wheel 10c of the first reducer group 10 are arranged parallel to the toothed wheel 15c and to the epicyclic reducer 15b, respectively, of the second reducer group 15.

Moreover, the ring gear 27 of the epicyclic reducer 10b and the toothed wheel 10c of the first downstream reducer group 10 are rotationally coupled to, respectively, the toothed wheel 15c and the ring gear 27 of the epicyclic reducer 15b of the second downstream reducer group 15.

This rotational cooperation is herein performed through rotation coupling means 29, in this case an intermediate idle pinion.

Moreover, within the first downstream reducer group 10, the satellite pinions 12 of the upstream epicyclic reducer 10a are connected, by a satellite-carrier 31 provided with a shaft 31a, to the planetary pinion 26 of the additional epicyclic reducer 10b.

The satellite pinions 28 of this additional epicyclic reducer 10b are themselves assembled, by a satellite-carrier 28a, to the toothed wheel 10c that carries the first output pinion 3.

Within the second downstream reducer group 15, the satellite pinions 21 of the upstream epicyclic reducer 15a are themselves assembled on a satellite-carrier 32 whose output shaft 32a is assembled with the planetary pinion 26 of the additional epicyclic reducer 15c; for that purpose, this shaft 32a passes through the toothed wheel 15c.

A satellite-carrier 33 is fastened, on the upstream side, to the toothed wheel 15c, and on the downstream side, to the second output pinion 19; for that purpose, this satellite-carrier 33 passes through the satellite pinions 28 of the additional epicyclic reducer 15b.

As developed hereinabove, if an overload is generated, the two upstream epicyclic reducers 10a and 15a generate a rotational effort in particular on the controlled pinion 16 leading to an increase of the torque at its shaft 17.

If this torque exceeds the characteristic limit torque of the torque limiting means 18, the driving effort of the motor 4 then causes a rotation of the controlled pinion 16 about its axis 16'.

This mechanical phenomenon hence allows the dissipation of this overload, avoiding a deterioration of the elements constituting the gear train 5.

The two output pinions 3, 19 of the gear train 5 hence rotate in opposite directions.

FIG. 6 illustrates a variant of the embodiment according to FIG. 5, which differs therefrom by the positioning of the output pinions 3, 19 in a same vertical plane, or at least approximately in a same vertical plane.

Here again, the interest is essentially a reduction of diameter of the reducer unit, which allows a more compact assembly, which is lighter and less expensive.

Within this framework, the gear train 5 is practically identical to that described hereinabove in relation with FIG. 5 in that it includes motor means 4 continued by an upstream group of elementary reducers 6 followed by two parallel downstream reducer groups 10, 15 each consisting in an epicyclic reducer 10a, 15a followed by two additional reducers 10b, 10c; 15b, 15c arranged in series.

Herein again, the second downstream reducer group 15 is associated, downstream, with the second output pinion 19, and upstream, with the torque limiting means 18.

This embodiment differs only by the structure of the coupling means between the parallel groups 10, 15, herein:
    the ring gear 16 of the first epicyclic reducer 10a is meshed directly on the ring gear 23 of the second epicyclic reducer 15a, advantageously through complementary external teeth forming coupling means 24,
    the ring gear 27 of the additional epicyclic reducer 10b of the first group 10 is meshed directly on the toothed wheel 15c of the second group 15, advantageously through complementary external teeth forming coupling means 29, and
    the ring gear 27 of the additional epicyclic reducer 15b of the second group 15 is meshed directly on the toothed wheel 10c of the second group 10, advantageously also through complementary external teeth forming coupling means 29.

In this case, the two output pinions 3, 19 of the gear train 5 rotate in a same direction.

According to a variant of the embodiments according to FIGS. 5 and 6, the two additional reducers 10b, 10c; 15b, 15c could be inverted relative to each other.

In this case, the first reducer group 10 includes the toothed wheel 10c upstream, followed by the additional epicyclic reducer 10b; conversely, the second reducer group 15 includes the epicyclic reducer 15b followed by the toothed wheel 15c.

Generally, such a mechanical structure according to the invention allows the dissipation of any dynamic or static overload applied to the gear train and liable to cause a deterioration of its constitutive elements.

The invention claimed is:

1. An offshore equipment (E) of the self-elevating type, comprising:
    at least one mobile structure (J) consisting of a leg and a fixed support (S) consisting of a shell; and
    at least one device (1) that maneuvers said at least one mobile structure in translation with respect to said fixed support, in lifting or lowering directions, along a translation axis,
    wherein said at least one device (1) comprises:
        at least one rack (2), integral with said mobile structure or said fixed support, and
        at least two output pinions (3, 19) that extend along parallel axes, which are integral with said fixed support or said mobile structure, respectively, and that each mesh with said at least one rack (2), for the translational maneuver of said mobile structure along said translation axis,
        said at least two output pinions (3, 19) are driven by motor means (4), through a gear train (5) carried by a frame (C) of said fixed support or said mobile structure, and
        said gear train (5) comprises wheel, pinion and/or ring gear elements,
    wherein at least one of said wheel, pinion and/or ring gear elements (16) of said gear train (5) includes a controlled element that is carried by a shaft (17) equipped with torque limiting means (18) that cooperates with said frame (C),
    wherein said torque limiting means (18) have a limit torque that is determined so as:
        to immobilize in rotation said controlled element (16) with respect to said frame (C) when the torque thereof is lower than said limit torque, in order to ensure the maneuver in translation of said mobile structure by the driving into rotation of said at least two output pinions (3, 19), and
        to allow a rotation of said controlled element (16) with respect to said frame (C) when the torque thereof is higher than said limit torque, to avoid the application of a static or dynamic overload to said gear train (5),
    wherein the gear train (5) includes two parallel groups (10, 15) each arranged for driving one of the at least two output pinions (3, 19), in which:
        a first group (10), that drives a first output pinion (3) of said of the at least two output pinions (3, 19) into rotation, is driven directly by the motor means (4), and
        a second group (15), that drives a second output pinion (19) of said of the at least two output pinions (3, 19) into rotation, is driven by said first group (10), said second group (15) including said controlled element (16) associated with said torque limiting means (18),
    wherein said first group (10) and said second group (15) each comprise at least one epicyclic reducer (10a, 15a) consisting of a planetary gear (11, 16), a ring gear (13, 23) and satellite gears (12, 21), and
    wherein the planetary gear (16) of said second group (15) corresponds to the controlled element (16) associated with the torque limiting means (18), and the satellite gears (21) of said second group (15) are arranged so as to drive, directly or indirectly, the second output pinion (19).

2. The equipment according to claim 1, wherein the frame (C) equips the fixed support (S).

3. The equipment according to claim 1, wherein said equipment comprises several devices (1) superimposed to each other.

4. The equipment according to claim 1, wherein the limit torque of the torque limiting means (18) is comprised between 0.1 and 3 times the nominal effort.

5. The equipment according to claim 1, wherein the torque limiting means (18) include means for adjusting the limit torque during the manoeuvre.

6. The equipment according to claim 1, wherein the torque limiting means (18) include means for piloting them to an inactive position, which permits a deactivation of said torque limiting means (18), in which the controlled element (16) is immobilized in rotation with respect to said frame (C).

7. The equipment according to claim 1, wherein the torque limiting means (18) is provided as a multi-disk brake.

8. The equipment according to claim 1, wherein the torque limiting means (18) cooperates with a water cooling means.

9. The equipment according to claim 1, wherein the ring gears (13, 23) of the two parallel groups (10, 15) include means (24) for their rotational coupling.

10. The equipment according to claim 1,
wherein each parallel group (10, 15) include, downstream the epicyclic reducer (10a, 15a), two serial reducers:
an epicyclic reducer (10b, 15b), consisted of a planetary gear (26), a ring gear (27) and satellite gears (28), and
a toothed wheel (10c, 15c),
and wherein said serial reducers (10b, 10c; 15b, 15c) are inverted on the two parallel groups (10, 15), with rotational coupling means (29) between the ring gear (27) of one epicyclic reducer (10b, 15b) of one of said parallel groups (10, 15) and the toothed wheel (10c, 15c) of the other parallel group (15).

* * * * *